Jan. 8, 1929.  
A. L. OTTO  
1,698,064  
METALLIC SCREEN  
Filed Feb. 7, 1924
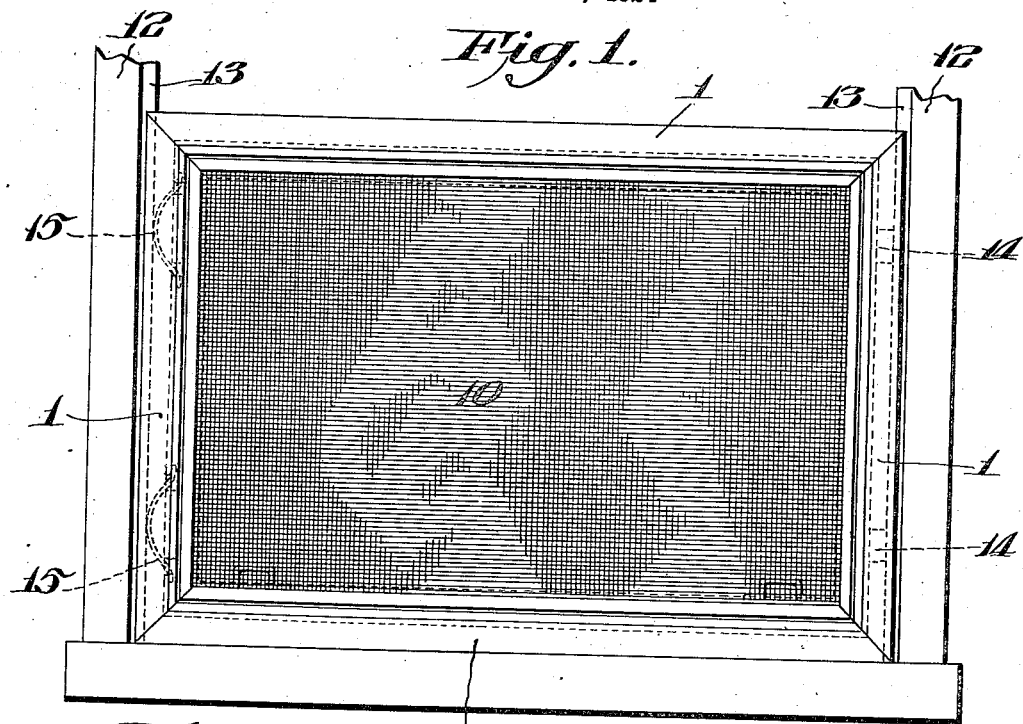
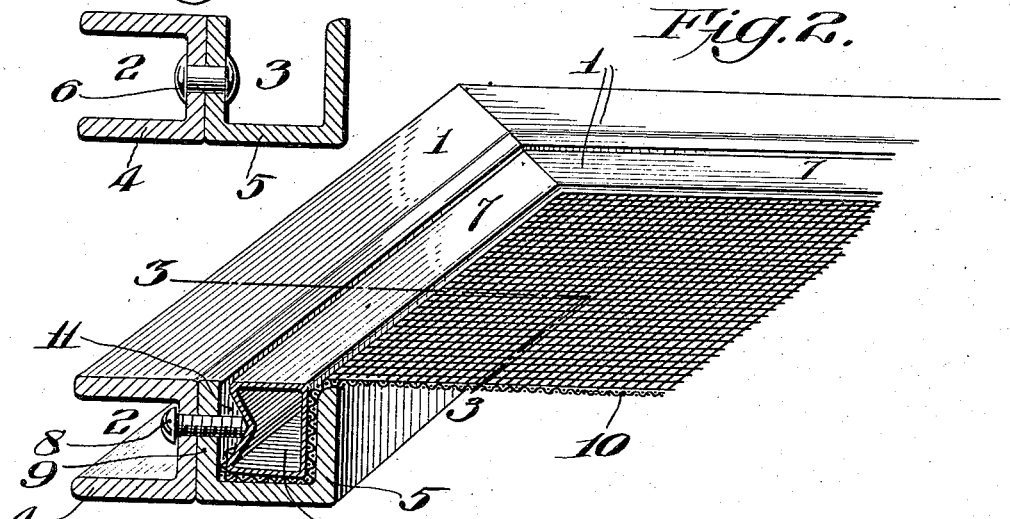
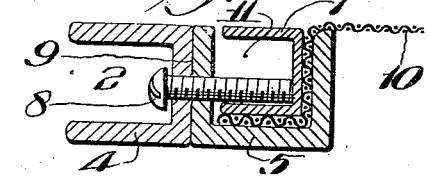
INVENTOR:  
Arthur L. Otto,  
BY  
ATTORNEYS.

Patented Jan. 8, 1929.

1,698,064

UNITED STATES PATENT OFFICE.

ARTHUR L. OTTO, OF PHILADELPHIA, PENNSYLVANIA, ASSIGNOR TO ORANGE SCREEN COMPANY, OF MAPLEWOOD, NEW JERSEY, A CORPORATION OF NEW JERSEY.

METALLIC SCREEN.

Application filed February 7, 1924. Serial No. 691,090.

My invention consists of certain novel construction in metallic screens for windows, doors and the like, whereby a more serviceable screen may be produced and at a lower cost than has been possible heretofore.

My invention further consists of a novel frame structure whereby extreme strength and rigidity is obtained as well as novel means for replaceably and at the same time positively securing metallic screen cloth to the frame.

My invention consists more particularly of novel frame members in metallic screens of composite cross section, built up of two or more elements of simpler cross section, each one of the elements being rigid and substantially nonbendable.

It has been customary heretofore in making metallic screen frames to shape the frame members out of strips of bendable sheet metal, bending the sheet metal back upon itself into various complex cross sectional shapes in an effort to obtain a rigid structure. Due to the very nature of the construction, however, no screen frame of any considerable size could be produced sufficiently rigid without the use of some reinforcing means. This was particularly noticeable in the case of the mitred corner joints which heretofore have been soldered along the thin contracting edges of the sheet metal, and in addition to the soldered joint, have been braced in some manner. This construction, however, gave results not entirely satisfactory, and particularly so in screen frames of large proportions in which case the screen was subject to distortions.

Up to the present time moreover, it has been the custom to provide frictional means only for securing the screen cloth to the frame. In the metallic screen of my novel construction, the screen is secured by positive locking means in contradistinction to the frictional securing means employed heretofore.

With the above ends in view, my invention consists of a frame each member of which is built up of two U shaped elements permanently united either by separate securing means such as rivets, bolts, or screws, or by some thermal means such as brazing, welding or soldering. Into one of the channels of the double U shaped members, I secure the edges of the screen cloth by means of metallic anchor members locked into position by a positively engaging locking means such as a screw.

For the purpose of illustrating my invention, I have shown in the accompanying drawings, forms thereof which are at present preferred by me, since the same will give in practice satisfactory and reliable results although it is to be understood that the various instrumentalities of which my invention consists may be variously arranged and organized and that my invention is not limited to the precise arrangement and organization of these instrumentalities as herein shown and described.

Figure 1 represents a view in elevation of a screen embodying my invention.

Figure 2 represents a perspective view partly sectional of a portion of the screen of my novel construction.

Figure 3 represents a section on line 3—3 Figure 2 showing a means of uniting the elements of my novel construction.

Figure 4 represents a sectional view illustrating a modification of my invention.

Referring to the drawings:—

The frame of my novel metallic screen construction comprises the double channelled frame member 1, containing the guiding channels 2 on the outer edges of the frame, and the screen retaining channels 3 on the inner edges or sides of the frame; and composed of the two U-shaped elements 4 and 5 respectively. This composite cross section not only gives an extremely rigid structure, but also greatly facilitates the production and reduces the cost of the frame members, since the individual U-shaped elements are easily produced, while the production of an integral double channelled member involves very costly methods in its manufacture thus greatly increasing the cost of the finished product. The two U-shaped elements are united by any well known means such as the rivets 6 shown in Figure 3, or simply by means of brazing, welding or soldering. The double channelled frame members of my screen are thus substantially integral pieces of metal which are also substantially nonbendable thereby adding greatly to the rigidity of the completed frame. Due to the solid character and relative thickness of the walls of my frame members, I am enabled to unite the same into an integral frame by any of the known processes of uniting metals, such as, welding, brazing, fusing and the like; thus making any other corner reinforcing means such as internal or external braces, clamps and the like entirely superfluous; in so far as the intimate union of the frame members provides a joint as strong as any part of the frame members.

While I may use any of the known structural metals or alloys in making my screen, I prefer to use a metal or alloy of several metals, which will not be subject to the corrosive action of the elements and at the same time lend an architectural value to the finished product by the natural color of the metal itself.

To the frame I secure the screen cloth in a novel manner, so as to afford ready means of attaching, as well as removing the screen cloth for the purpose of rewiring; and at the same time provide positive locking means for the said screen cloth. I accomplish this end by providing a channelled anchor member 7 within the screen retaining channel, and set screws 8 threaded into the central web 9 of the double channelled frame member. In wiring a frame, the screen cloth 10 is cut to the proper size, and is then laid over the frame with its edges overlapping the screen retaining channels. The edges are then secured to the frame members in rotation;—by first pressing or rolling the overlapping edge into the screen retaining channel 3 then forcing the anchor member into the said screen retaining channel over the edge of the screen cloth and finally inserting the locking screws 8 into the locking groove or channel 11 of the said anchor, as shown in Figures 2 and 4.

While my novel metallic screen structure is adapted to be made up in any of the common types of screens, such as sliding, stationary, hinged or other screens; I have in the figures an embodiment of my novel in the Figures an embodiment of my novel construction in the sliding type of screen;— wherein the screen is secured to the window frame 12 in a slidable manner, by means of the guide strips 13 fixed to the window frame; the two vertical guide channels of the screen frame; and the fixed bearings 14 and yieldable bearings 15 within said guide channels on the two sides of the screen frame respectively.

The grooved anchor member in addition to providing positive locking means for the screen cloth, possesses a further advantage in providing the space or groove 11 into which the free ends of the springs 15 may be allowed to project when inserted through the slots 16 provided in the central web of the double channelled frame member.

It is thus clearly seen from the above description that the screen of my novel construction embodies a number of distinct advantages; among them, the extreme strength and resistance of the frame members, against any force tending to crush the same, as well as the perfect and intimate union of the several frame members; resulting in a structure indestructible for all practical purposes, which is a decided improvement over the built-up sheet metal screen frames heretofore in use, which are subject to identations and crushing due to external forces. My construction moreover being stronger and more rigid, will permit the use of narrower frame members, thus excluding less light and air when in position, and being of neater design and less conspicuous.

Having thus described my invention what I claim as new and desire to secure by Letters Patent, is:—

A metallic screen comprising a frame formed of rails and stiles, each composed of two U-shaped channel members having the bottom of the outer channel permanently secured to the outer wall of the inner channel, said rails and stiles being permanently united end to end at angles to each other to form a closed frame, screen cloth having its edges positioned in the inner screen retaining channel, a screen anchor member in said inner channels superimposed upon the edges of said screen cloth, and a plurality of set screws extending through the joined walls of said two channel members and engaging said screen anchor member thereby to lock the same and to secure the edges of the screen.

ARTHUR L. OTTO.